United States Patent [19]

Hoehn

[11] 3,870,898

[45] Mar. 11, 1975

[54] FREQUENCY-TO-VOLTAGE CONVERTER

[75] Inventor: Wolfgang Hoehn, Freiburg, Germany

[73] Assignee: ITT Industries, Inc., New York, N.Y.

[22] Filed: Apr. 17, 1974

[21] Appl. No.: 461,664

[30] Foreign Application Priority Data

Sept. 8, 1973 Germany .......................... 2345421

[52] U.S. Cl. ................ 307/233, 307/295, 324/78 J, 328/140, 330/30 D

[51] Int. Cl. ............................................ G01r 23/06

[58] Field of Search ............ 321/6; 307/271, 233 R, 307/233 A, 233 B, 295; 328/140; 324/78 E, 78 F, 78 J; 330/30 D

[56] References Cited

UNITED STATES PATENTS

| | | | |
|---|---|---|---|
| 3,473,133 | 10/1969 | Hummel | 328/140 X |
| 3,512,013 | 5/1970 | Calfee | 307/233 |
| 3,558,979 | 1/1971 | Lorenz | 330/30 D |
| 3,590,379 | 6/1971 | Fellerman et al. | 324/78 J |
| 3,689,848 | 9/1972 | Geffe et al. | 330/30 D |

*Primary Examiner*—William H. Beha, Jr.
*Attorney, Agent, or Firm*—John T. O'Halloran; Menotti J. Lombardi, Jr.; Alfred C. Hill

[57] ABSTRACT

There is disclosed a frequency-to-voltage converter containing a differential amplifier having an additional transistor whose base to emitter path is connected in parallel to the collector to base path of one of the differential amplifier transistors. The additional transistor is a part of a voltage divider controlling one of the two differential inputs so that the output voltage from the collector of the additional transistor is no longer power supply voltage dependent.

7 Claims, 1 Drawing Figure

PATENTED MAR 11 1975 3,870,898
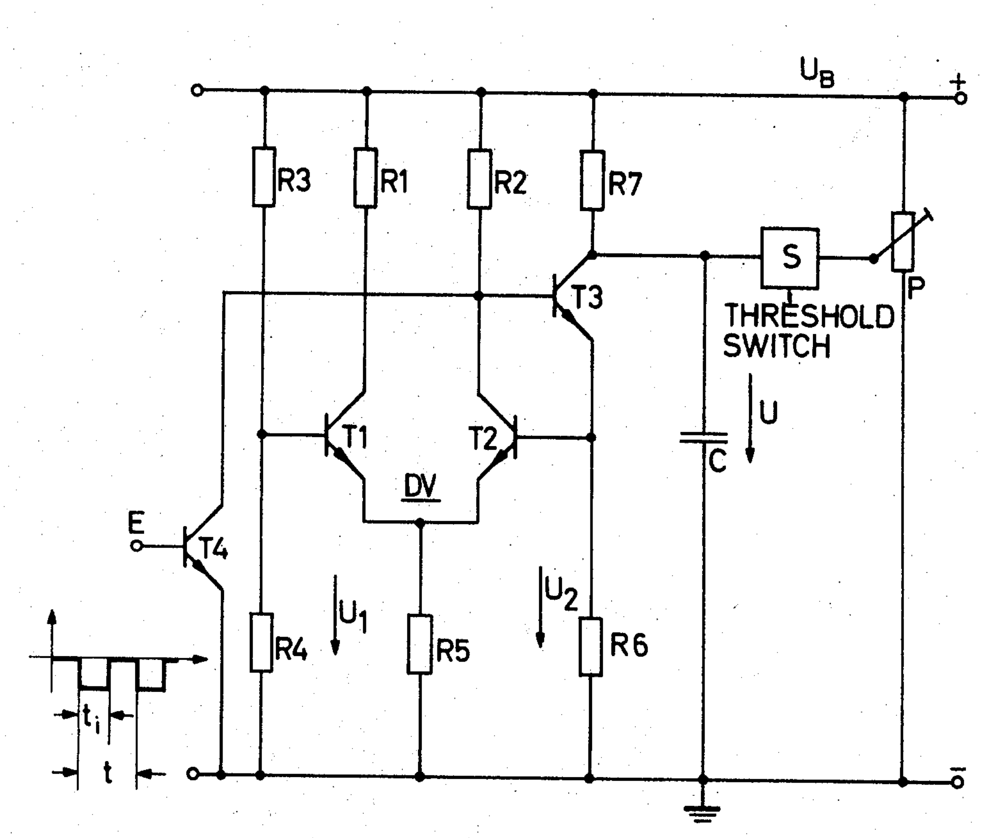

FREQUENCY-TO-VOLTAGE CONVERTER

BACKGROUND OF THE INVENTION

The present invention deals with a problem which arises in frequency-to-voltage converters when a voltage generated across a capacitor as a function of the pulse duty cycle of a square-wave signal is to be compared, in a threshold circuit, with a supply-voltage-dependent threshold value. This must be done, for example, in electronic speed-measuring circuits for motor vehicles if the frequency, and, thus, the speed-dependent voltage, not only is to be indicated by an instrument, but also used to trigger visual or sound signals if a threshold value is exceeded. This threshold value is fixed in the simplest manner by a voltage divider connected across the supply-voltage source. In this case, however, the threshold value is dependent on supply-voltage variations, which can be compensated for by stabilizing the supply voltage, but this increases circuit complexity.

SUMMARY OF THE INVENTION

An object of the present invention is to provide a circuit for a frequency-to-voltage converter such that stabilization of the supply voltage determining the threshold value can be dispensed with.

The invention starts from the recognition that additional stabilization of the voltage determining the threshold value can be dispensed with if the voltage generated across the capacitor depends on the supply voltage in the same manner as the threshold value. In this case, the temperature coefficients are compensated for as well.

A feature of the present invention is the provision of a monolithic integrable frequency-to-voltage converter in which a voltage is generated across a capacitor as a function of the pulse duty cycle of a square-wave input signal, the voltage being compared in a threshold circuit with a supply-voltage-dependent threshold value, the converter comprising: a supply-voltage source having a first terminal supplying a given polarity supply voltage and a second terminal which is grounded; a symmetrical differential amplifier including a first amplifying transistor and a second amplifying transistor connected between the first and second terminals; a first voltage divider connected between the first and second terminals, the voltage divider having a junction point connected to the base of the first transistor; a second voltage divider including a first resistor connected between the second terminal and the base of the second transistor, a first additional transistor having its emitter connected to the base of the second transistor, its base connected to the collector of the second transistor, and its collector connected by a second resistor to the first terminal; the capacitor being connected between the collector of the first additional amplifier and one of the first and second terminals; and an input circuit for the square-wave input signal to apply the input signal to the collector of the second transistor and the base of the first additional transistor.

BRIEF DESCRIPTION OF THE DRAWING

The above-mentioned and other features and objects of this invention and the manner of obtaining them will become more apparent by reference to the following description taken in conjunction with the drawing, the single Figure of which is a schematic diagram of a frequency-to-voltage converter in accordance with the principles of this invention.

DESCRIPTION OF THE PREFERRED EMBODIMENT

The frequency-to-voltage converter substantially consists of the symmetrical differential amplifier DV, which contains the amplifying transistors T1 and T2, the additional transistor T3, and the capacitor C. The amplifying transistors T1 and T2 of the differential amplifier DV are interconnected, in known manner, to form a symmetrical differential amplifier by having the common emitter resistor R5 and the two collector resistors R1 and R2. One input of the differential amplifier DV, namely, the base of amplifying transistor T1, is connected to the tap of the voltage divider including the resistors R3 and R4 connected across the supply voltage $U_B$.

The other input of the differential amplifier, i.e., the base of amplifying transistor T2, is connected via the resistor R6 to ground, which is identical with the negative supply-voltage terminal, and to the emitter of additional transistor T3, whose collector is connected via the resistor R7 to the ungrounded, i.e., positive supply-voltage terminal. The base of additional transistor T3 is connected to the collector of amplifying transistor T2, while the collector of additional transistor T3 is connected to one plate of capacitor C. The other plate of capacitor C is grounded in the circuit diagram of the drawing, but it may also be connected to the ungrounded supply-voltage terminal.

The voltage U across the collector of additional transistor T3 and, thus, across capacitor C is applied to the threshold switch S, whose threshold value is determined by the adjustable voltage divider P connected across the supply voltage $U_B$.

The square-wave signal whose frequency is to be converted to a voltage is applied via the input E to the collector of amplifing transistor T2 and, thus, to the base of additional transistor T3.

Instead of the collector resistors R1 and R2, constant-current sources may, of course, be provided in a known manner, which is of particular advantage if the circuit according to the invention is realized using monolithic integrated bipolar technology.

With the components and supply-voltage-source polarity shown in the drawing, i.e., if npn transistors are used, the circuit according to the invention is controlled at input E by negative pulses whose duration $t_i$ is constant, while their period $t$ and, consequently, their frequency are variable. The control is advantageously effected via a second additional transistor, namely the transistor T4, whose emitter is connected to ground and whose collector is connected to the collector of amplifying transistor T2, while its base is connected to input E.

pnp transistor could be employed in place of the npn transistors in the circuit of the sole Figure if voltage $U_B$ was made negative and the input signal E had positive pulses.

For the duration $t_i$ of the negative pulses, the second additional transistor T4 is off and thus does not influence the differential amplifier DV, so that both bases of amplifying transistors T1 and T2 are at the same potentials $U_1 = U_2$. Thus, a constant current of the magnitude $U_2/R6$ flows in the collector of the first additional transistor T3. This current represents part of the discharge current of capacitor C. The other part of the discharge current flows through resistor R7.

During the times of the period $t$ which lie outside $t_i$, the second additional transistor T4 is on, so that the first additional transistor T3 is off and capacitor C can charge up through resistor R7.

Thus, with respect to the collector of the first additional transistor T3, the circuit has the behavior of a pulsating voltage source which has the same internal resistor R7 for both voltage states. At zero input frequency, therefore, a voltage equal in value to the supply voltage $U_B$ appears across the capacitor C. As the frequency increases, the voltage decreases linearly until it reaches its lowest value at a pulse duty cycle of the input signal of 100 percent (if resistor R4 is equal in value to resistor R6, and resistor R3 is equal in value to resistor R7). For the capacitor voltage U the following relation holds:

$$U = U_B (1 - T [R7/R6([R3/R4 + 1)]),$$

where T is the pulse duty factor $t_i/t$.

Thus, in case of fixed resistance ratios, the voltage U appearing across capacitor C is only dependent on, and proportional to, supply voltage $U_B$. If the circuit is realized using monolithic integrated technology, the resistance ratios can be assumed to be temperatureand voltage-independent because the resistors are disposed on the same semiconductor body and show good thermal coupling among one another at low relative tolerances. Thus, the object of the invention, i.e., dependence of the voltage derived from the input frequency on the supply voltage has been attained, and the switching point of threshold switch S is independent of the supply voltage because the threshold value set at the potentiometer P also varies in proportion to the supply voltage.

Another advantage of the circuit arrangement according to the invention is that the direct current voltage U developed across capacitor C is not dependent on the tolerances of capacitor C, but that the latter's tolerances only enter into the ripple of voltage U. The same applies to the integrated resistor R7.

While I have described above the principles of my invention in connection with specific apparatus it is to be clearly understood that this description is made only by way of example and not as a limitation to the scope of my invention as set forth in the objects thereof and in the accompanying claims.

I claim:

1. A monolithic integrable frequency-to-voltage converter in which a voltage is generated across a capacitor as a function of the pulse duty cycle of a square-wave input signal, said voltage being compared in a threshold circuit with a supply-voltage-dependent threshold value, said converter comprising:

a supply-voltage source having a first terminal supplying a given polarity supply voltage and a second terminal which is grounded;

a symmetrical differential amplifier including a first amplifying transistor and a second amplifying transistor connected between said first and second terminals;

a first voltage divider connected between said first and second terminals, said voltage divider having a junction point connected to the base of said first transistor;

a second voltage divider including a first resistor connected between said second terminal and the base of said second transistor, a first additional transistor having its emitter connected to the base of said second transistor, its base connected to the collector of said second transistor, and its collector connected by a second resistor to said first terminal;

said capacitor being connected between the collector of said first additional amplifier and one of said first and second terminals; and an input circuit for said square-wave input signal to apply said input signal to the collector of said second transistor and the base of said first additional transistor.

2. A converter according to claim 1, wherein said capacitor is connected between the collector of said first additional amplifier and said second terminal.

3. A converter according to claim 2, wherein said input circuit includes an input terminal, and a second additional transistor having its base connected to said input terminal, its emitter connected to said second terminal and its collector connected to the collector of said second transistor and the base of said first additional transistor.

4. A converter according to claim 1, wherein said input circuit includes an input terminal, and a second additional transistor having its base connected to said input terminal, its emitter connected to said second terminal and its collector connected to the collector of said second transistor and the base of said first additional transistor.

5. A converter according to claim 1, wherein said first terminal supplies a positive polarity supply voltage, and said first, second and first additional transistors are npn transistors.

6. A converter according to claim 5, wherein said capacitor is connected between the collector of said first additional amplifier and said second terminal.

7. A converter according to claim 6, wherein said input circuit includes an input terminal, and a second additional npn transistor having its base connected to said input terminal, its emitter connected to said second terminal and its collector connected to the collector of said second transistor and the base of said first additional transistor.

* * * * *